(12) United States Patent
Hino et al.

(10) Patent No.: US 8,774,342 B2
(45) Date of Patent: Jul. 8, 2014

(54) BOILING WATER NUCLEAR PLANT AND STEAM DRYER

(75) Inventors: Yuko Hino, Hitachi (JP); Kazushige Ishida, Hitachi (JP); Naoshi Usui, Tsukuba (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 663 days.

(21) Appl. No.: 13/030,189

(22) Filed: Feb. 18, 2011

(65) Prior Publication Data

US 2011/0216872 A1 Sep. 8, 2011

(30) Foreign Application Priority Data

Mar. 5, 2010 (JP) ................. 2010-048564

(51) Int. Cl.
- *G21C 15/16* (2006.01)
- *B01D 53/54* (2006.01)
- *G21C 15/00* (2006.01)
- *B01D 53/00* (2006.01)

(52) U.S. Cl.
USPC ........... 376/371; 376/347; 376/361; 376/366; 376/370; 55/434; 55/442; 55/445; 423/210; 423/235; 423/239.1

(58) Field of Classification Search
USPC ......... 376/308, 310, 313–315, 347, 361, 366, 376/370, 371, 277, 300, 301; 34/523, 108, 34/130, 135; 95/90, 116, 130, 131; 96/4, 96/7–14, 108, 153, 154; 423/210, 219, 423/235–239.2, 212, 213.2, 213.5; 502/400, 407, 416, 417, 439; 122/488, 122/491; 55/315, 318, 320–337, 342, 345, 55/346, 348, 428, 434, 436, 442–445, 482, 55/484; 422/129, 168–183
See application file for complete search history.

(56) References Cited

U.S. PATENT DOCUMENTS

| | | | | |
|---|---|---|---|---|
| 3,041,134 A | * | 6/1962 | Weeks | 423/219 |
| 3,821,078 A | * | 6/1974 | Mansson et al. | 376/371 |
| 3,838,554 A | * | 10/1974 | Wilhelm et al. | 95/131 |
| 3,871,841 A | * | 3/1975 | Queiser et al. | 95/130 |
| 3,914,390 A | * | 10/1975 | Kudo et al. | 423/239.1 |
| 3,964,965 A | * | 6/1976 | Kausz et al. | 376/310 |
| 4,058,381 A | * | 11/1977 | Traiteur | 55/444 |
| 4,167,444 A | * | 9/1979 | Schweiger | 376/310 |
| 4,169,814 A | * | 10/1979 | Inaba et al. | 423/237 |
| 4,270,938 A | * | 6/1981 | Schmidt et al. | 376/310 |

(Continued)

FOREIGN PATENT DOCUMENTS

| | | |
|---|---|---|
| JP | 1-127999 A | 5/1989 |
| JP | 4-216496 A | 8/1992 |

(Continued)

*Primary Examiner* — Bernarr Gregory
(74) *Attorney, Agent, or Firm* — Crowell & Moring LLP

(57) ABSTRACT

In the boiling water nuclear plant of the present invention, a steam dryer is disposed in a reactor pressure vessel. Materials that have capability of capturing nitrogen compounds containing N-16 are supported on porous member. The porous members are placed in a region where steam goes through in the steam dryer. For example, both or either of perforated plates installed in the steam dryer is constituted of the porous member on which N-16 capture material is supported. When steam containing N-16 goes through the perforated plates, the N-16 is captured by the porous member, whereby the N-16 transfer amount into the turbine system is reduced.

10 Claims, 6 Drawing Sheets

(56) References Cited

U.S. PATENT DOCUMENTS

| | | | |
|---|---|---|---|
| 4,382,879 A * | 5/1983 | Funabashi et al. | 502/407 |
| 4,383,500 A * | 5/1983 | Lavalerie et al. | 122/491 |
| 4,714,055 A * | 12/1987 | Sundheimer | 122/488 |
| 4,783,204 A * | 11/1988 | Roarty | 55/348 |
| 4,935,042 A * | 6/1990 | Sudo et al. | 55/484 |
| 4,992,232 A | 2/1991 | Cowan, II et al. | |
| 5,015,362 A * | 5/1991 | Chin | 423/235 |
| 5,019,328 A * | 5/1991 | Niino et al. | 376/310 |
| 5,080,699 A * | 1/1992 | Ho et al. | 55/484 |
| 5,085,826 A * | 2/1992 | Oosterkamp | 376/371 |
| 5,130,079 A * | 7/1992 | Chakraborty | 376/301 |
| 5,271,753 A * | 12/1993 | Akel et al. | 55/436 |
| 5,275,644 A * | 1/1994 | Teigen et al. | 55/320 |
| 5,290,530 A * | 3/1994 | Muramatsu et al. | 423/239.1 |
| 5,320,817 A * | 6/1994 | Hardwick et al. | 423/237 |
| 5,515,406 A | 5/1996 | Cowan, II et al. | |
| 5,716,899 A * | 2/1998 | Guile et al. | 502/439 |
| 5,948,376 A * | 9/1999 | Miyoshi et al. | 423/213.5 |
| 5,963,611 A * | 10/1999 | Narabayashi et al. | 376/371 |
| 6,010,673 A * | 1/2000 | Kanazawa et al. | 423/213.5 |
| 6,415,527 B1 * | 7/2002 | Rasanen et al. | 34/135 |
| 6,946,107 B2 * | 9/2005 | Carlborg et al. | 423/239.1 |
| 7,238,332 B2 * | 7/2007 | Feaver et al. | 423/210 |
| 7,566,426 B2 * | 7/2009 | Zuberi | 422/180 |
| 8,218,709 B2 * | 7/2012 | Eckardt | 376/314 |
| 8,311,179 B2 * | 11/2012 | Erbes et al. | 376/371 |
| 2002/0057755 A1 | 5/2002 | Hemmi et al. | |

FOREIGN PATENT DOCUMENTS

| | | |
|---|---|---|
| JP | 4-278496 A | 10/1992 |
| JP | 7-151898 A | 6/1995 |
| JP | 8-313664 A | 11/1996 |
| JP | 2001-147291 A | 5/2001 |
| JP | 2001-343480 A | 12/2001 |
| JP | 2009-281893 A | 12/2009 |
| WO | WO 2012/111172 A1 | 8/2012 |

* cited by examiner

BOILING WATER NUCLEAR PLANT AND STEAM DRYER

CLAIM OF PRIORITY

The present application claims priority from Japanese Patent application Ser. No. 2010-48564, filed on Mar. 5, 2010, the content of which is hereby incorporated by reference into this application.

BACKGROUND OF THE INVENTION

1. Technical Field

The present invention relates to a boiling water nuclear plant, and a steam dryer applied to the boiling water nuclear plant.

2. Background Art

A configuration example of the boiling water nuclear plant is described. A core, a steam separator, and a steam dryer are disposed in a reactor pressure vessel included in the boiling water nuclear plant. The steam separator disposed above the core separates steam generated at the core from cooling water, and the steam dryer disposed above the steam separator separates droplets from the steam separated by the steam separator. The steam dried by the steam dryer so as to contain not more than a specified amount of the droplets is supplied from a main steam nozzle to a steam turbine through a main steam line.

In the boiling water nuclear plant constructed as described above, radioactive nitrogen (N-16) is generated at the core due to reaction between oxygen (O-16) included in reactor water and neutrons. The above N-16 has a half-life of 7.1 sec, and emits high energy gamma rays (6.129 MeV). Out of the generated N-16, N-16 that becomes highly volatile chemical forms of ammonia ($NH_3$) and nitric oxide (NO) does not remain in the reactor water, but vaporizes and introduces to the steam turbine with the steam, thereby causing an increase in the radiation dose in the turbine system.

Recently, in the boiling water nuclear plant, hydrogen injection is conducted to reduce dissolved oxygen included in the reactor water in the reactor pressure vessel for the purpose of preventing stress corrosion cracking in the structural members of the reactor pressure vessel and reactor internal therein. However, the radiation dose rate in the turbine system is inclined to rise rapidly when the hydrogen injection amount reaches a certain value in the course of increases in the hydrogen injection amount. This is because N-16 that is dissolved in the reactor water as poorly volatile chemical forms such as nitrate ions during normal operation is reduced to be highly volatile chemical forms of $NH_3$ and NO by the hydrogen injection, and entrained with the main steam. The upper limit of the hydrogen injection amount is set due to the rise in the radiation dose rate.

Previously, as a technology for reducing the N-16 amount that transfers to the turbine system, a method is proposed in which a catalyst is disposed between the steam separator and the steam dryer to change N-16 of a highly volatile ammonia form into poorly volatile nitrogen compounds (for example, Japanese Patent Laid-Open No. 7 (1995)-151898).

Moreover, since N-16 has a short half-life, a method is proposed in which the time at which the steam reaches the main steam nozzle from the steam dryer is delayed physically to reduce N-16 by using adsorption materials, whereby the N-16 transfer amount into the turbine system is reduced (for example, Japanese Patent Laid-Open No. 2001-147291).

CITATION LIST

Patent Literature

Patent literature 1: Japanese Patent Laid-Open No. 7 (1995)-151898
Patent literature 2: Japanese Patent Laid-Open No. 2001-147291

SUMMARY OF THE INVENTION

Technical Problem

In Japanese Patent Laid-Open No. 7 (1995)-151898, however, since the catalyst is disposed between the steam separator and the steam dryer, there is a possibility that the steam having high moisture content comes in contact with the catalyst surface and a water film is formed on the catalyst surface. For that reason, surface area of the catalyst with which N-16 in a gas phase comes in contact becomes small, and it has been difficult to maintain the reaction efficiency.

So as to reduce N-16 by adsorption in the main steam pipe based on the technology disclosed in Japanese Patent Laid-Open No. 2001-147291, the surface area of the adsorption material on which N-16 and the adsorption material come in contact sufficiently is required. But, since the main steam pipe needs to be narrowed or a plurality of smaller pipes need to be placed for that, there has been concern about decreased power generation efficiency. In addition, a method in which the steam separator and steam dryer are plated with a noble metal is described in Japanese Patent Laid-Open No. 2001-147291. However, when for example, a corrugated panel as a component member of the steam dryer installed in current boiling water nuclear plants is plated with a noble metal, since dried steam has a low possibility of coming in contact with the corrugated panel, N-16 contained in the dried steam also has a low possibility of adsorption by the noble metal plated on the corrugated panel and there has been a problem in the transfer amount reduction effect. In addition, in Japanese Patent Laid-Open No. 2001-147291, also when a perforated plate as a component member of the steam dryer is plated with noble metal, since the perforated plate of the current steam dryer has a structure in which a metal plate having a thickness of several millimeters is perforated with a plurality of holes and some steam goes through without coming in contact with the perforated plate, there has been a problem in adsorption efficiency of N-16 into the noble metal and reduction effect of the transfer amount.

It is an object of the present invention to provide a boiling water nuclear plant that can reduce radiation dose rate in a turbine system by reducing transfer amount of N-16 into the turbine system.

Solution to Problem

A feature of the present invention for attaining the above object is a boiling water nuclear plant disposing porous materials on which materials that have capability of capturing nitrogen compounds containing N-16 are supported, in a region through which steam flows formed in the steam dryer disposed in the reactor pressure vessel of the boiling water nuclear plant.

Advantageous Effect of the Invention

According to the present invention, while power generation efficiency is maintained, contact efficiency between the materials that have the capability of capturing nitrogen compounds containing N-16 and nitrogen compounds containing N-16 can be improved, and the N-16 transfer amount into the turbine system can be reduced, whereby the radiation dose rate of the turbine system can be reduced.

DETAILED DESCRIPTION OF THE PREFERRED EMBODIMENTS

Embodiments of the present invention are described below with reference to the drawings.

[Embodiment 1]

Figure 1:
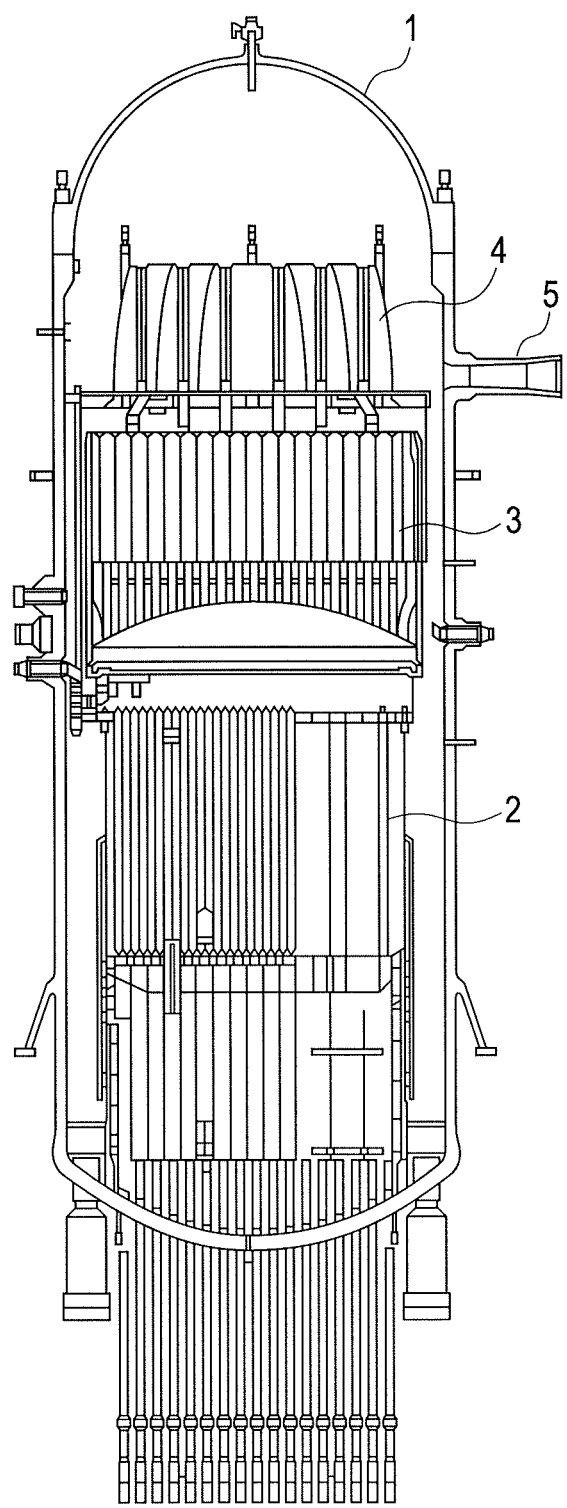
FIG. 1 is a longitudinal sectional view showing a boiling water nuclear plant according to embodiment 1, which is a preferred embodiment of the present invention.
Figure 2:
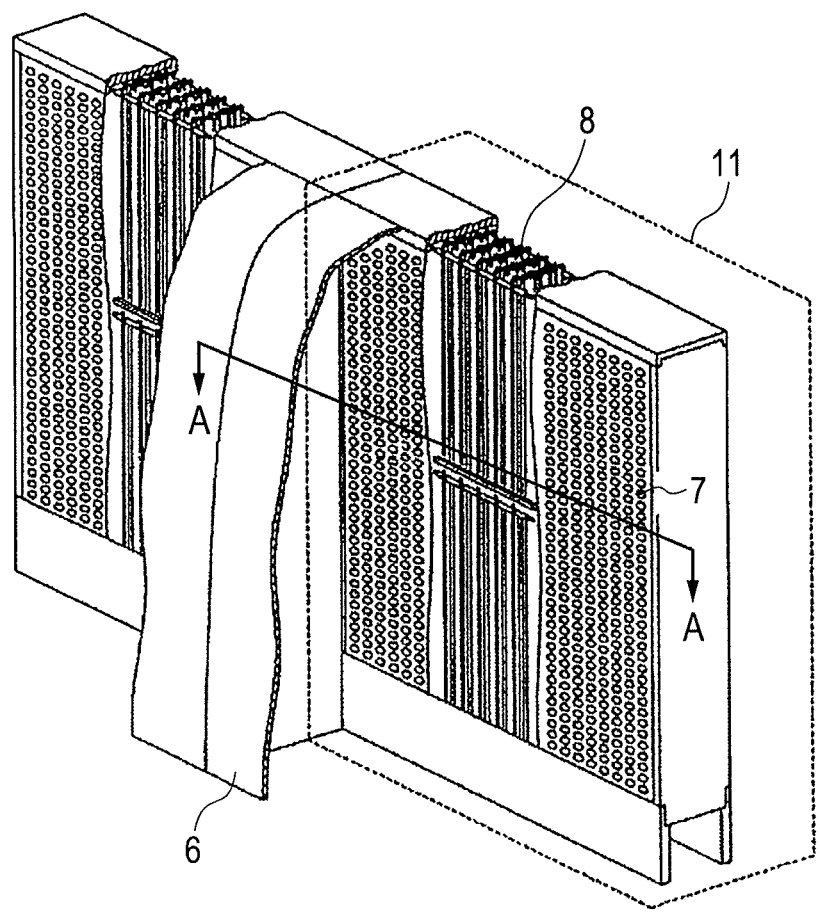
FIG. 2 is a perspective view showing a steam dryer shown in FIG. 1.
Figure 3:
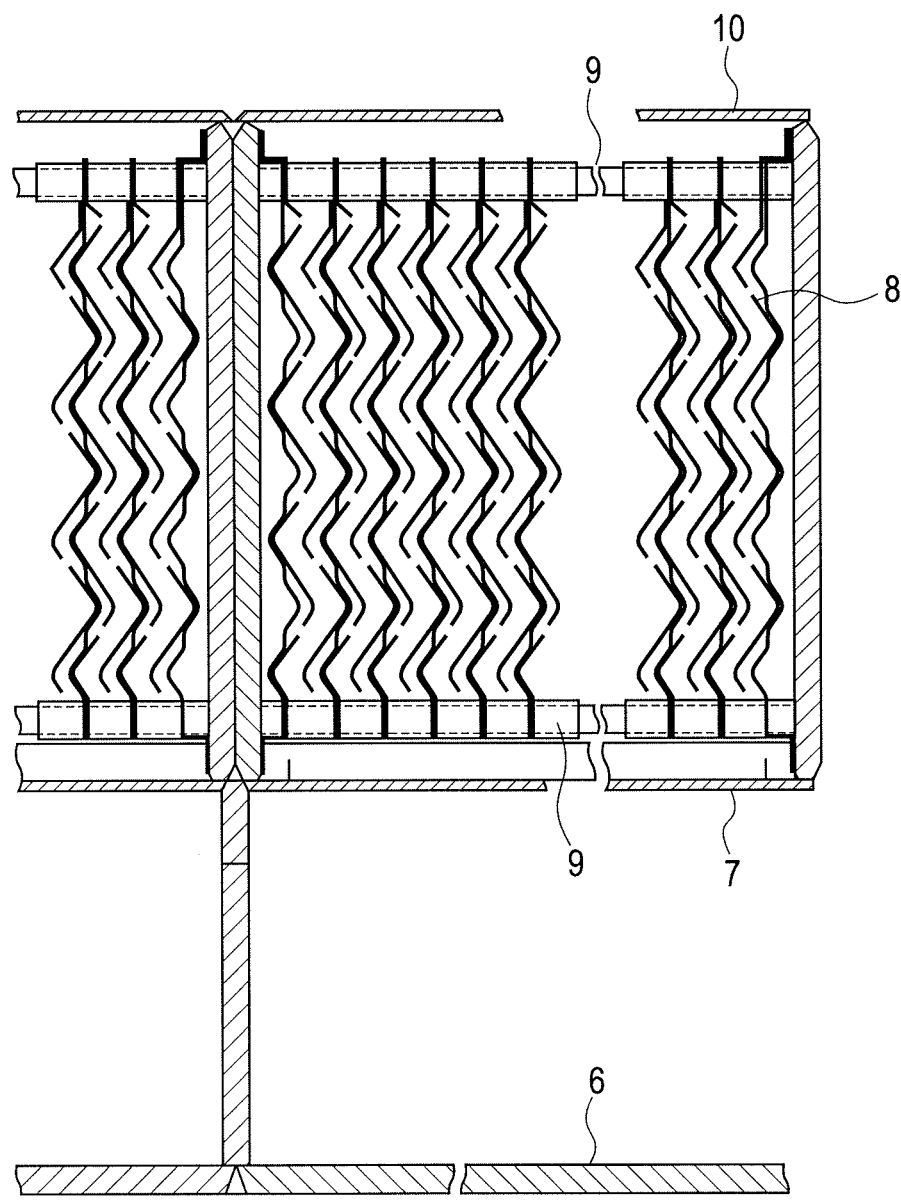
FIG. 3 is a sectional view taken along a line A-A of FIG. 2.
Figure 4:
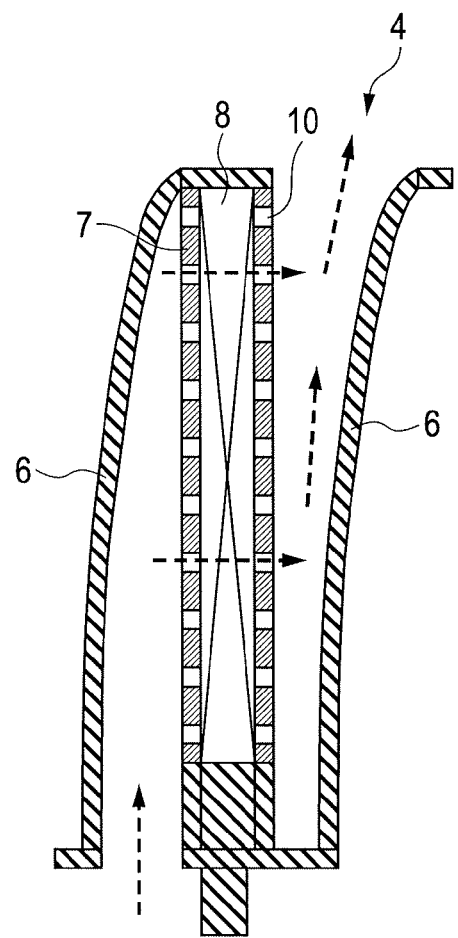
FIG. 4 is a longitudinal sectional view showing a steam dryer shown in FIG. 1.

A boiling water nuclear plant according to embodiment 1, which is a preferred embodiment of the present invention, is described with reference to FIG. 1 shows a longitudinal section of the boiling water nuclear plant. FIG. 2 shows a steam dryer disposed in a reactor pressure vessel of the boiling water nuclear plant. FIG. 3 shows a sectional view taken along a line A-A of the steam dryer shown in FIG. 2. FIG. 4 shows a longitudinal section of the steam dryer.

As shown in FIG. 1, a core 2, a steam separator 3, and a steam dryer 4 are installed in the reactor pressure vessel 1 composing the boiling water nuclear plant. In the core 2, cooling water supplied to the core 2 is heated by heat emitted from nuclear fuel including in a plurality of fuel rods within fuel assemblies loaded in the core 2, whereby steam is generated. In addition, neutrons emitted from the nuclear fuel perform nuclear reaction with oxygen atoms (O-16) in the cooling water, whereby radioactive nitrogen (N-16) is generated. N-16 generated by the nuclear reaction reacts with water molecules in the cooling water and radicals generated from the water molecules by radiation decomposition and then becomes chemical forms of ammonia and nitrogen compounds (NO, $NO_2$, and $NO_3^-$, etc.). Out of these nitrogen compounds containing N-16, highly volatile forms of ammonia and NO move as gas with the steam in the core 2.

The steam generated in the core 2 moves upward with the cooling water in the reactor pressure vessel 1 and reaches the steam separator 3 disposed above the core 2. The steam separator 3 separates the steam generated in the core 2 from the cooling water. In this case, the nitrogen compounds containing N-16 included in the steam as gas pass through the steam separator 3 with the steam and reach the steam dryer 4. The steam dryer 4 removes droplets from the steam separated by the steam separator 3 and dries the steam so that a rate of the droplets contained in the steam becomes a specified value or less. Also in this case, gaseous nitrogen compounds containing N-16 pass through the steam dryer 4 with the dried steam.

Since the steam including the nitrogen compounds containing N-16 and dried by the steam dryer 4 is supplied to a steam turbine from a main steam nozzle 5 through a main steam line, the radiation dose rate in the turbine system increases with high energy gamma beams.

Next, structure of the steam dryer 4 and steam flow within the steam dryer 4 is described with reference to FIG. 2, FIG. 3, and FIG. 4. The steam dryer 4 has a plurality of steam dryer units 11 shown in FIG. 2. The steam dryer unit 11 is equipped with a hood plate 6 (hereinafter, referred to as hood 6), perforated plates 7 and 10, a fixation rod 9 (FIG. 3), and a plurality of corrugated panels 8. The perforated plate 7 is disposed at an upstream side (inlet side) of the steam flow, and the perforated plate 10 is disposed at a downstream side (outlet side). The perforated plate 7 faces the hood 6. The perforated plates 7 and 10 have a plurality of through holes being fine pore, respectively. The corrugated panels 8 are disposed between the perforated plate 7 and the perforated plate 10 and fixed with the fixation rod 9. The hood 6 is placed in such a way that the hood 6 covers the perforated plate 7 of the steam dryer unit 11, and has an aperture on the lower side. In FIG. 2, only a part of the structure of the hood 6 is shown.

The steam containing droplets that have passed through the steam separator 3 flows into the hood 6 from the aperture formed on the lower side of the hood 6, and passes through the steam dryer unit 11 and is discharged into an upper region in the reactor pressure vessel 1. In FIG. 4, the steam flow is shown by dashed arrows. The steam, of which the flow direction is turned from the upward to the horizontal direction in the hood 6, is dispersed by the perforated plate 7 having the plurality of through holes, passes between the corrugated plate 8, goes through the plurality of through holes formed in the latter corrugated plate 10, and is discharged into the upper region in the reactor pressure vessel 1.

One of the characteristics of the present embodiment is that at least one of the perforated plates 7 and 10 disposed in the steam dryer 4 is made of porous member on which materials having performance of capturing nitrogen compounds containing N-16 (hereinafter, referred to as N-16 capture materials) are supported. By the structure like this, N-16 contained in the steam going through the perforated plates 7 and 10 comes in contact with the N-16 capture materials and is captured by the N-16 capture materials and separated from the steam. In consequence, the N-16 amount that transfers into the turbine system with the steam is reduced, whereby the radiation dose rate of the turbine system can be reduced. As described above, since N-16 have a short half-life of 7.1 sec, when N-16 are retained on adsorbents (N-16 capture materials), the N-16 amount is reduced to ½, whereby the radiation dose of the turbine system caused by N-16 can also be reduced to ½.

At this time, the reason is described why the N-16 capture materials are placed on the perforated plates 7 and 10. When places where the N-16 capture materials are placed are selected, important factors are to have good N-16 capture efficiency and to be un-influential in power generation efficiency. The N-16 capture efficiency can be improved by making the contacting efficiency with steam better and contact time with steam long enough for capturing N-16.

Figure 5:
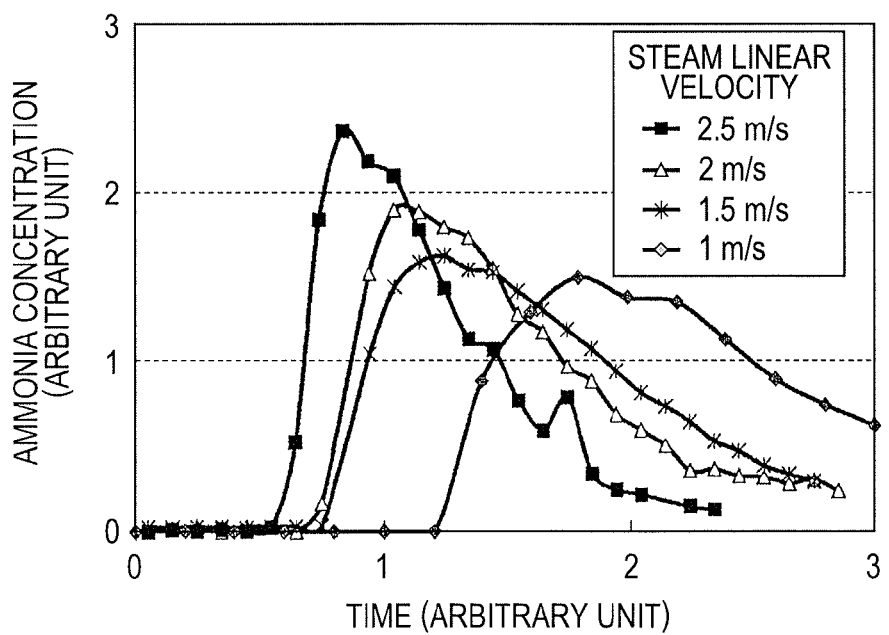
FIG. 5 is an explanatory drawing showing test results of ammonia adsorption by zeolite.

At this time, a relation between N-16 capture efficiency and contact time with steam is described based on results of experiments conducted by the inventors. The inventors experimentally examined dependence properties of time period of adsorption and retention of ammonia onto zeolite on gas linear velocity by using the ammonia, which is a typical chemical form of N-16, and the zeolite as an example of ammonia adsorbents. In the test, an adsorption tower filled with the zeolite is heated to about 285° C. to simulate the temperature of the steam going through the steam dryer 4, saturated steam (atmospheric pressure) is passed through the adsorption tower, and the ammonia is injected one time pulsingly from an inlet of the adsorption tower and the ammonia concentration at an outlet of the adsorption tower was measured. In the test, the linear velocity of the saturated steam going through the adsorption tower is made to be a parameter. FIG. 5 is a diagram showing the ammonia concentration of outlet steam plotted over time. According to the drawing, the smaller the steam linear velocity, the slower an outflow of the ammonia is inclined, and the outflow peak width (time period in which the ammonia is detected from outlet steam) is inclined to be longer. This shows that as the steam linear velocity becomes smaller, that is, contact time with zeolite as an adsorbent becomes longer, the ammonia stays longer on the adsorbent. For that reason, the N-16 capture efficiency can be improved by placing N-16 capture materials in a region of small steam linear velocity.

As the steam passing rate becomes larger and steam flow passage becomes narrower, contacting efficiency with steam becomes larger. When this is taken into consideration, the perforated plates 7 and 10 in the steam dryer 4 are suitable for placing N-16 capture materials on, and a high N-16 capture efficiency can be obtained, because all the steam that is discharged into the upper region of the reactor pressure vessel and is exhausted into the main steam line passes through the perforated plates, the steam linear velocity at the perforated plates 7 and 10 is a small value of 1 m/s or less, and the steam flow passage has a narrow structure to straighten steam flow.

By giving functions for capturing nitrogen compounds including N-16 to at least one of the perforated plates 7 and 10 like the embodiment, the steam passing rate becomes larger and the contacting efficiency with steam becomes larger to improve the N-16 capture efficiency. Moreover, by constituting the perforated plates 7 and 10 with porous member, respectively, the steam flow passage can be narrower and the contacting efficiency with steam becomes larger to further improve the N-16 capture efficiency.

Concerning power generation efficiency, since a conventional steam dryer 4 has also porous plates, in the present embodiment, reducing N-16 is possible while power generation efficiency is maintained, by constituting the perforated plates 7 and 10 with porous member having about the same or less of pressure loss of the perforated plates used for a conventional steam dryer.

As N-16 capture materials, at least one material is selected from materials that adsorb N-16 compounds entrained with steam, such as the ammonia and nitric monoxide, materials that form chemical bonds with N-16 compounds by reaction, and materials that resolve N-16 compounds by catalytic reaction. For example, compounds that have adsorption capability for the ammonia are selected. These compounds include metallic compounds that have acid centers on a solid surface, clay minerals such as zeolite and sepiolite, hydroxyl apatite, carbon compounds such as activated carbon, and metal carbides. In addition, an ammonia decomposition catalyst on which metal such as platinum, nickel, ruthenium, manganese are supported can also be used. Metals and metal oxides that have adsorption capability for nitrogen oxides typified by nitric monoxide and nitrogen compound decomposition catalyst on which platinum, transition metals, etc. are supported can also be used.

N-16 capture materials are supported on porous member made of metallic materials such as stainless steel. Configurations of porous members include, for example, a steel plate with through holes being fine pore, honeycomb, metal ribbon, mesh, foam metal, and sponge. Each of the porous members is made of at least one from metal, metal compound, metal carbide, and metal nitride.

The method of supporting the N-16 capture materials on metallic steel includes, for example, a method using a binder and a method of attaching by reaction. The best suited method is selected depending on the selected N-16 capture materials and the kinds of metallic steel.

In addition, if design requirements of the steam dryer 4 such as structural strength are satisfied, N-16 capture materials themselves can be fabricated into porous member and used as the perforated plates 7 and 10.

N-16 capture materials and structural materials of the porous member used for the perforated materials 7 and 10 can be the same materials or different materials. The droplet amount in the steam going through the perforated plate 7 is different from that going through the perforated plate 10, and the steam going through the perforated plate 7 contains more droplets than the steam going through the perforated plate 10. For that reason, N-16 capture materials used for the perforated plate 7 can be selected from N-16 capture materials having high efficiency in wet conditions, and N-16 capture materials used for the perforated plate 10 can be selected from N-16 capture materials having high efficiency in dry conditions.

According to the boiling water nuclear plant and the steam dryer of the embodiment, by capturing nitrogen compounds containing N-16 generated in the boiling water nuclear plant at the steam dryer placed in the reactor pressure vessel of the nuclear power plant, while power generation efficiency is maintained, contact efficiency between materials that have the capability of capturing nitrogen compounds containing N-16 and nitrogen compounds containing N-16 is improved to reduce the N-16 transfer amount into the turbine system, whereby the radiation dose rate of the turbine system can be reduced.

[Embodiment 2]

Figure 6:
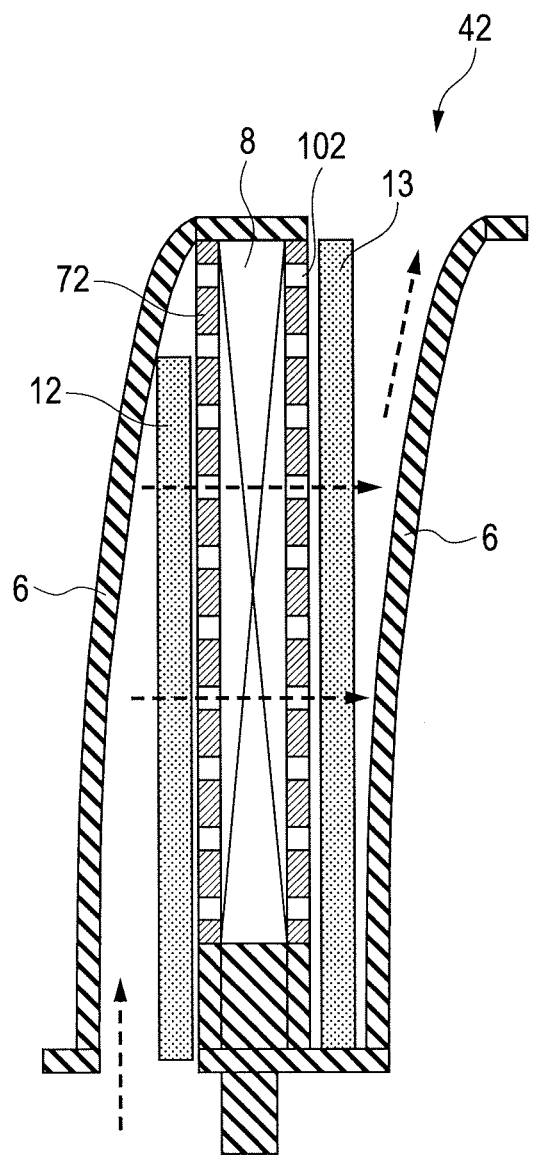
FIG. 6 is a longitudinal sectional view showing a boiling water nuclear plant according to embodiment 2, which is another embodiment of the present invention.

A boiling water nuclear plant according to embodiment 2, which is another embodiment of the present invention, is described with reference to FIG. 6. FIG. 6 shows a longitudinal section of a steam dryer placed in the reactor pressure vessel 1 of the boiling water nuclear plant of the present embodiment. Since steam flow in a reactor pressure vessel 1 is the same as that in embodiment 1, description is omitted.

As shown in FIG. 6, a steam dryer 42 of the present embodiment is equipped with a hood 6, perforated plates 72 and 102, a fixation rod 9, and a plurality of corrugated panels 8 fixed by the fixation rod 9, and is further equipped with N-16 capture devices 12 and 13. One of the characteristics of the present embodiment is that the N-16 capture device 12 is placed in front of the steam inlet side of the perforated plate 72 and the N-16 capture device 13 is placed in back of the steam outlet side of the perforated plate 102. The N-16 capture devices 12 and 13 are made of porous member on which N-16 capture materials are supported.

The steam that has passed through the steam separator 3 flows into the hood 6, and passes the N-16 capture unit 12. This steam goes through the perforated plate 72, each steam path formed between the corrugated panels 8, and the perforated plate 102, passes the N-16 capture device 13, and is discharged into the upper region of the reactor pressure vessel 1. When the steam goes through the N-16 capture devices 12 and 13, N-16 contained in the steam is captured on the N-16 capture devices 12 and 13 by adsorption, reaction, catalytic action, etc., whereby the N-16 amount that transfers to the turbine system is reduced.

In the present embodiment, since the N-16 capture devices 12 and 13 are placed in the interior space of the steam dryer 4, the devices can be thickened within the range where the N-16 capture devices 12 and 13 can be placed. Since either of these devices, whichever is thicker, has the time period in which the steam contacts with N-16 capture materials becoming longer to increase the captured N-16 amount, whereby the radiation dose reduction effect of the turbine system is increased.

The thickness of the N-16 capture devices 12 and 13 is limited by pressure loss for maintaining specified power generation efficiency along with size of an installation space of these devices.

As the same as embodiment 1, the N-16 capture devices 12 and 13 are fabricated in such a way that N-16 capture materials selected from at least one material that can adsorb, react with, or catalytically decompose N-16 compounds entrained with the steam are supported on porous members made of metallic steel etc. If the structural strength is secured, the porous member can be fabricated by N-16 capture materials and used as the N-16 capture device.

Both or either of the N-16 capture devices 12 and 13 can be placed. N-16 capture materials and structural materials for the porous members used for the N-16 capture devices 12 and 13 can be the same materials or different materials.

According to the boiling water nuclear plant and the steam dryer of the present embodiment, by capturing nitrogen compounds containing N-16 generated in the reactor at the steam dryer placed in the reactor pressure vessel of the nuclear power plant, while power generation efficiency is maintained, contact efficiency between materials that have the capability of capturing nitrogen compounds containing N-16 and nitrogen compounds containing N-16 can be increased, and to reduce the N-16 transfer rate into the turbine system can be reduced, whereby the radiation dose rate of the turbine system is reduced.

In addition, according to the present embodiment, since the N-16 capture devices are placed in the interior space of the existing steam dryer, the steam dryer does not need to be replaced, thereby enabling the economic efficiency to be high. Moreover, since the N-16 capture devices can be thickened within the range where the N-16 capture devices can be placed in the inner space of the steam dryer, the reduction effect of N-16 and the radiation dose of the turbine system can be increased.

[Embodiment 3]

A boiling water nuclear plant according to embodiment 2, which is another embodiment of the present invention, is described with reference to FIG. 7. Since steam flow in a reactor pressure vessel 1 is the same as that in embodiment 1, description is omitted.

Figure 7:
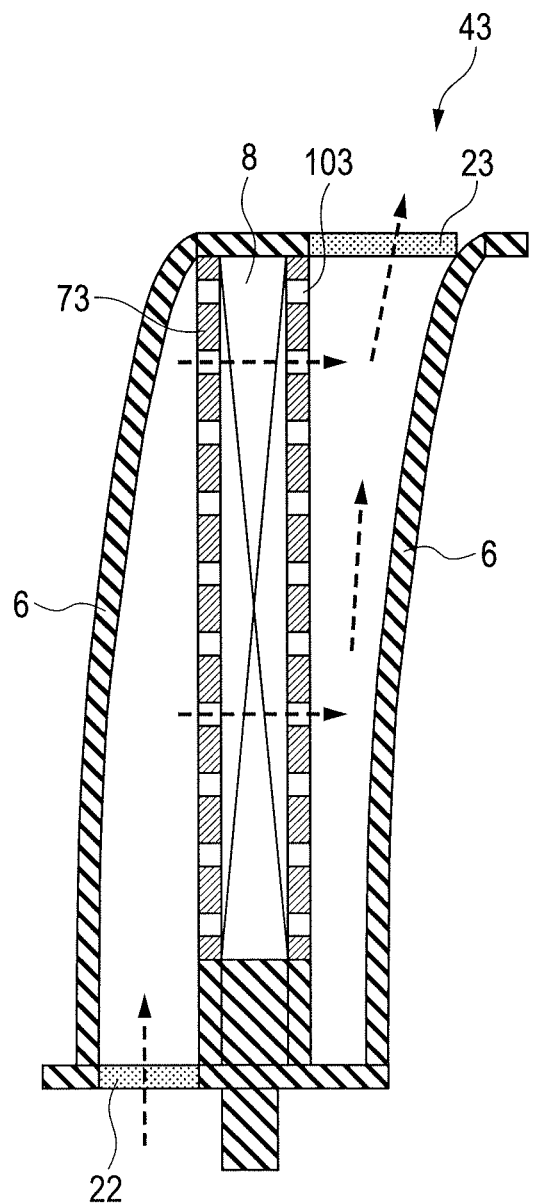
FIG. 7 is a longitudinal sectional view showing a boiling water nuclear plant according to embodiment 3, which is another embodiment of the present invention.

As shown in FIG. 7, a steam dryer 43 of embodiment 3 is equipped with a hood 6, perforated plates 73 and 103, a fixation rod 9, and a corrugated panel 8 fixed by the fixation rod 9, and is further equipped with N-16 capture devices 22 and 23. One of the characteristics of the present embodiment is that the N-16 capture device 22 is placed at a steam inlet of the hood 6 and the N-16 capture device 23 is placed at a steam outlet of the steam dryer 43. The N-16 capture devices 22 and 23 are made of porous member on which N-16 capture materials are supported.

The steam that has passed through the steam separator 3 passes the N-16 capture device 22, and flows into the hood 6. This steam goes through the perforated plate 73, each steam path formed between the corrugated panels 8, and the perforated plate 103, passes the N-16 capture device 23, and is discharged into the upper region of the reactor pressure vessel 1. When the steam goes through the N-16 capture devices 22 and 23, N-16 contained in the steam is captured on the N-16 capture devices 22 and 23 by adsorption, reaction, catalytic action, etc., whereby the N-16 amount that transfers to the turbine system is reduced.

The thickness of the N-16 capture devices 22 and 23 is limited by the size of the installation space and pressure loss.

As the same as embodiments 1 and 2, the N-16 capture devices 22 and 23 are fabricated in such a way that N-16 capture materials selected from at least one material that can adsorb, react with, or catalytically decompose N-16 compounds entrained with the steam are supported on porous members made of metallic steel etc. If the structural strength is secured, N-16 capture member can be fabricated by N-16 capture materials and used as the N-16 device. N-16 capture materials used for the N-16 capture devices 22 and 23 and structural materials for the porous members can be the same materials or different materials. Both or either of the N-16 capture devices 22 and 23 can be placed.

Additionally, by placing the N-16 capture device 22 at the steam inlet, the steam flowing into the steam dryer 43 is straightened, whereby droplet removal effect at the perforated plate 73 and the corrugated panel 8 can be improved. Moreover, by placing the N-16 capture device 23 at the steam outlet, the steam discharged into the upper region of the reactor pressure vessel 1 is straightened, whereby pressure loss caused by friction etc. when the steam flows from the steam dryer 43 to the main steam nozzle 5 is reduced.

According to the boiling water nuclear plant and the steam dryer of the present embodiment, by capturing nitrogen compounds containing N-16 generated in the reactor at the steam dryer placed in the reactor pressure vessel of the nuclear power plant, while power generation efficiency is maintained, contact efficiency between materials that have the capability of capturing nitrogen compounds containing N-16 and nitrogen compounds containing N-16 can be increased, and the N-16 transfer rate into the turbine system can be reduced, whereby the radiation dose rate of the turbine system is reduced.

In addition, the transfer of N-16 and the radiation dose of the turbine system can be reduced, and equipment efficiency can also be improved by the steam straightening effect.

[Reference Signs List]

1: reactor pressure vessel, 2: core, 3: steam separator, 4, 42, 43: steam dryer, 5: main steam nozzle, 6: hood plate, 7, 10, 72, 73, 102, 103: perforated plate, 8: corrugated panel, 9: fixation rod, 11: steam dryer unit, 12, 13, 22, 23: N-16 capture device.

What is claimed is:

1. A boiling water nuclear plant, comprising:
   a reactor pressure vessel;
   a steam dryer disposed in said reactor pressure vessel; and
   either at least one first porous member on which a material that captures radioactive nitrogen compounds is supported or at least one second porous member constituted of said material,
   wherein said first or second porous member is placed at a region through which steam goes in said steam dryer.

2. The boiling water nuclear plant according to claim 1, wherein said first porous member is a perforated plate installed in said steam dryer.

3. The boiling water nuclear plant according to claim 2, wherein a radioactive nitrogen compound capture device having said first porous member is placed in at least one of a steam inlet side and a steam outlet side of said perforated plate installed in the steam dryer.

4. The boiling water nuclear plant according to claim 3, wherein said material captures at least one of ammonia and nitrogen monoxide by at least one function from adsorption reaction, chemical reaction, and catalytic action.

5. The boiling water nuclear plant according to claim 2, wherein said material captures at least one of ammonia and nitrogen monoxide by at least one function from adsorption reaction, chemical reaction, and catalytic action.

6. The boiling water nuclear plant according to claim 1, wherein said material captures at least one of ammonia and nitrogen monoxide by at least one function from adsorption reaction, chemical reaction, and catalytic action.

7. The boiling water nuclear plant according to claim 1, wherein said first or second porous member is constituted of at least one from metal, metal compound, metal carbide, and metal nitride.

8. A steam dryer placed in a nuclear pressure vessel of a boiling water nuclear plant, wherein either at least one first porous member on which a material that captures radioactive nitrogen compounds is supported or at least one second porous member constituted of said material is placed at a region through which steam goes in said steam dryer.

9. The steam dryer of a boiling water nuclear plant according to claim 8, wherein said first porous member is a perforated plate installed in said steam dryer.

10. The steam dryer of a boiling water nuclear plant according to claim 8, wherein said first porous member is disposed in a device placed in at a steam inlet side and a steam outlet side of said perforated plate installed in the steam dryer.

* * * * *